United States Patent
Choi et al.

(10) Patent No.: US 10,708,750 B2
(45) Date of Patent: Jul. 7, 2020

(54) METHOD AND APPARATUS FOR PEER-TO-PEER CONNECTION USING WIRELESS LOCAL AREA NETWORK (LAN) IN MOBILE COMMUNICATION TERMINAL

(71) Applicant: Samsung Electronics Co., Ltd., Suwon-si, Gyeonggi-do (KR)

(72) Inventors: Jong-Mu Choi, Gunpo-si (KR); Jeong-Hoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 14/496,573

(22) Filed: Sep. 25, 2014

(65) Prior Publication Data

US 2015/0009981 A1    Jan. 8, 2015

Related U.S. Application Data

(63) Continuation of application No. 12/903,532, filed on Oct. 13, 2010, now Pat. No. 8,848,677.

(30) Foreign Application Priority Data

Oct. 13, 2009  (KR) .................... 10-2009-0097146

(51) Int. Cl.
*H04W 4/00*  (2018.01)
*H04W 8/00*  (2009.01)
*H04W 76/14*  (2018.01)
*H04L 29/08*  (2006.01)
*H04W 84/12*  (2009.01)

(52) U.S. Cl.
CPC ....... *H04W 8/005* (2013.01); *H04L 29/08396* (2013.01); *H04L 67/1061* (2013.01); *H04W 76/14* (2018.02); *H04W 84/12* (2013.01)

(58) Field of Classification Search
CPC .................................................. H04W 76/026
See application file for complete search history.

(56) References Cited

U.S. PATENT DOCUMENTS

| 6,842,460 B1 * | 1/2005 | Olkkonen | H04W 48/16 370/328 |
| 6,876,643 B1 * | 4/2005 | Aggarwal | H04W 8/005 370/254 |
| 6,901,057 B2 * | 5/2005 | Rune | H04W 84/20 370/310 |

(Continued)

FOREIGN PATENT DOCUMENTS

WO  2004/032536 A2  4/2004
WO  2009/008662 A2  1/2009

*Primary Examiner* — Guang W Li
(74) *Attorney, Agent, or Firm* — Jefferson IP Law, LLP

(57) ABSTRACT

An apparatus and a method for Peer-to-Peer (P2P) connection using a wireless Local Area Network (LAN) in a mobile communication terminal are provided. The method includes detecting a P2P connection attempt of a new terminal not connected to P2P communication, during P2P communication with at least one terminal, determining whether the mobile communication terminal operates as a slave terminal or a group owner in the P2P connection, and when the mobile communication terminal operates as the slave terminal, transmitting a signal indicating that the P2P connection attempt of the new terminal is detected, to a terminal operating as the group owner in the P2P connection.

18 Claims, 6 Drawing Sheets

(56) References Cited

U.S. PATENT DOCUMENTS

| | | | | |
|---|---|---|---|---|
| 7,164,885 B2* | 1/2007 | Jonsson | H04W 48/20 | 455/41.2 |
| 7,242,677 B2* | 7/2007 | Hong | H04W 8/005 | 370/338 |
| 7,298,761 B2* | 11/2007 | Hong | H04W 8/005 | 370/310 |
| 7,304,968 B2* | 12/2007 | Dawidowsky | H04W 48/20 | 370/331 |
| 7,502,591 B2* | 3/2009 | Dabak | H04W 92/02 | 370/328 |
| 7,706,822 B2* | 4/2010 | Emeott | H04W 56/001 | 455/502 |
| 7,720,098 B1* | 5/2010 | Allen | H04W 28/20 | 370/464 |
| 7,756,942 B2 | 7/2010 | Iwamura | | |
| 7,801,097 B2* | 9/2010 | Bahr | H04W 8/005 | 370/254 |
| 7,961,674 B2 | 6/2011 | Jing et al. | | |
| 8,077,614 B2* | 12/2011 | Ji | H04J 3/0664 | 370/230 |
| 8,204,230 B2* | 6/2012 | Schmidt | H04L 63/0428 | 370/329 |
| 8,265,004 B2* | 9/2012 | Toutonghi | H04W 8/005 | 370/328 |
| 8,351,339 B2* | 1/2013 | Zhen | H04L 45/26 | 370/248 |
| 8,401,001 B2* | 3/2013 | Adamovsky | H04W 48/08 | 370/350 |
| 8,954,502 B1* | 2/2015 | Kopikare | H04L 67/1051 | 709/204 |
| 9,319,956 B2* | 4/2016 | McManus | H04W 36/30 | |
| 9,614,641 B2* | 4/2017 | Geirhofer | H04W 8/005 | |
| 10,412,774 B2* | 9/2019 | Fujita | H04W 76/14 | |
| 2001/0002912 A1* | 6/2001 | Tony | H04L 29/06 | 370/487 |
| 2001/0005368 A1 | 6/2001 | Rune | | |
| 2001/0029166 A1* | 10/2001 | Rune | H04W 84/20 | 455/41.2 |
| 2002/0042693 A1 | 4/2002 | Kampe et al. | | |
| 2002/0044549 A1 | 4/2002 | Johansson et al. | | |
| 2002/0075940 A1* | 6/2002 | Haartsen | H04B 1/713 | 375/132 |
| 2002/0151320 A1 | 10/2002 | Wasenius | | |
| 2002/0156893 A1* | 10/2002 | Pouyoul | G06F 9/544 | 709/225 |
| 2002/0159401 A1 | 10/2002 | Boger | | |
| 2002/0168943 A1* | 11/2002 | Callaway, Jr. | H04B 17/318 | 455/67.11 |
| 2002/0188657 A1 | 12/2002 | Traversat et al. | | |
| 2003/0028585 A1* | 2/2003 | Yeager | G06F 9/4416 | 709/201 |
| 2003/0081603 A1* | 5/2003 | Rune | H04W 72/1289 | 370/390 |
| 2003/0110291 A1 | 6/2003 | Chen | | |
| 2003/0204742 A1 | 10/2003 | Gupta et al. | | |
| 2004/0162871 A1* | 8/2004 | Pabla | H04W 8/005 | 709/201 |
| 2004/0203936 A1 | 10/2004 | Ogino et al. | | |
| 2004/0218620 A1* | 11/2004 | Palm | H04W 74/02 | 370/445 |
| 2004/0257470 A1* | 12/2004 | Leyendecker | H04N 7/163 | 348/552 |
| 2005/0070227 A1* | 3/2005 | Shen | H04B 1/44 | 455/41.3 |
| 2005/0148315 A1* | 7/2005 | Sawada | H04B 7/2606 | 455/403 |
| 2005/0188103 A1* | 8/2005 | Chen | H04L 45/04 | 709/238 |
| 2005/0249137 A1* | 11/2005 | Todd | H04W 52/0216 | 370/311 |
| 2005/0262216 A1 | 11/2005 | Kashiwabara et al. | | |
| 2007/0115827 A1 | 5/2007 | Boehnke et al. | | |
| 2007/0211686 A1 | 9/2007 | Belcea et al. | | |
| 2007/0253345 A1 | 11/2007 | Habetha et al. | | |
| 2008/0062945 A1 | 3/2008 | Ahuja et al. | | |
| 2008/0095163 A1 | 4/2008 | Chen et al. | | |
| 2009/0017817 A1 | 1/2009 | Bleckert et al. | | |
| 2009/0086745 A1 | 4/2009 | Shufrun et al. | | |
| 2009/0170554 A1* | 7/2009 | Want | H04M 1/72502 | 455/552.1 |
| 2009/0296602 A1* | 12/2009 | Bange | H04W 8/005 | 370/254 |
| 2010/0042668 A1 | 2/2010 | Liang et al. | | |
| 2010/0128701 A1* | 5/2010 | Nagaraja | H04W 76/10 | 370/338 |
| 2010/0161817 A1 | 6/2010 | Xiao et al. | | |
| 2010/0250673 A1* | 9/2010 | Laroia | H04L 67/16 | 709/204 |
| 2011/0010246 A1* | 1/2011 | Kasslin | G06Q 30/0267 | 705/14.64 |
| 2011/0026504 A1* | 2/2011 | Feinberg | H04W 4/08 | 370/338 |
| 2011/0082905 A1* | 4/2011 | Wentink | H04W 84/20 | 709/205 |
| 2011/0082939 A1* | 4/2011 | Montemurro | H04W 76/023 | 709/227 |
| 2011/0082940 A1* | 4/2011 | Montemurro | H04L 69/24 | 709/227 |
| 2011/0098043 A1 | 4/2011 | Yu et al. | | |
| 2011/0282989 A1* | 11/2011 | Geirhofer | H04W 8/005 | 709/224 |
| 2012/0057456 A1* | 3/2012 | Bogatin | H04W 28/08 | 370/230.1 |
| 2012/0134349 A1* | 5/2012 | Jung | H04W 8/005 | 370/338 |
| 2012/0158981 A1* | 6/2012 | Desai | H04L 67/1093 | 709/230 |
| 2012/0163235 A1* | 6/2012 | Ho | H04L 67/1061 | 370/254 |
| 2012/0185583 A1* | 7/2012 | Wu | H04W 76/10 | 709/224 |
| 2013/0316642 A1* | 11/2013 | Newham | H04W 52/0206 | 455/11.1 |

* cited by examiner

METHOD AND APPARATUS FOR PEER-TO-PEER CONNECTION USING WIRELESS LOCAL AREA NETWORK (LAN) IN MOBILE COMMUNICATION TERMINAL

PRIORITY

This application is a continuation application of a prior application Ser. No. 12/903,532, filed on Oct. 13, 2010, which claimed the benefit under 35 U.S.C. § 119(a) of a Korean patent application filed in the Korean Intellectual Property Office on Oct. 13, 2009 and assigned Ser. No. 10-2009-0097146, the entire disclosure of each of which is hereby incorporated by reference.

BACKGROUND OF THE INVENTION

1. Field of the Invention

The present invention relates to a method and an apparatus for Peer-to-Peer (P2P) connection using a wireless Local Area Network (LAN) in a mobile communication terminal. More particularly, the present invention relates to a method and an apparatus for connecting at least one terminal with another terminal in process of P2P communication using the P2P communication in a mobile communication terminal

2. Description of the Related Art

A wireless local area communication network, which is defined by the Institute of Electrical and Electronics Engineers (IEEE) 802.11 standard, defines an infrastructure mode and an ad-hoc mode. The ad-hoc mode allows a plurality of IEEE 802.11 standard radio stations to directly communicate with each other without using access points or other wired network connections, which is also referred to as a Peer-to-Peer (P2P) mode. The P2P mode is useful by configuring a wireless network rapidly and easily without a wireless infrastructure. However, the P2P mode resource data rate is limited to 11 Mbps, security is limited, and it is difficult to reduce power consumption.

Hence, recently, a P2P mode including a group owner and a slave terminal is suggested.

FIG. 1 illustrates a conventional P2P connection with a structure including the group owner and the slave terminal between mobile communication terminals. FIG. 2 is a conventional P2P connectable range of a mobile communication terminal.

In FIG. 1, a terminal 100 wanting a P2P operation searches a P2P terminal 102 in its vicinity through a P2P discovery procedure in step 110. Upon finding the P2P terminal 102, the terminal 100 wanting the P2P operation builds a P2P network with the searched P2P terminal 102 through a P2P group owner negotiation procedure and a channel negotiation procedure in step 112. As a result, when the terminal 100 wanting the P2P operation is set to the slave terminal and the searched P2P terminal 102 is set to the group owner, the terminal 100 determined as the slave terminal attempts a connection to the terminal 102 determined as the group owner and thus two terminals 100 and 102 are connected with the P2P communication in step 114.

However, in the group owner/slave terminal structure, when the slave terminal, not the group owner terminal, detects the P2P connection attempt of another terminal, the other terminal is not connectable although the other terminal is in the P2P connection area. For example, in FIG. 2, when a terminal B 202 and a terminal C 204 are in the P2P connection and the terminal B 202 serving as the slave terminal detects the P2P connection attempt of another terminal A 200 as illustrated in FIG. 2, the P2P connection of the terminal A 200 with the terminal B 202 and the terminal C 204 is impossible because the terminal A 200, which travels in the connection area of the terminal B 202 serving as the slave terminal, is out of the connection area of the terminal C 204 serving as the group owner.

Therefore, a need exists for a method and apparatus for connecting a mobile communication terminal out of a connection area with one of a plurality of mobile communication terminals in a P2P connection.

SUMMARY OF THE INVENTION

An aspect of the present invention is to address the above-mentioned problems and/or disadvantages and to provide at least the advantages described below. Accordingly, an aspect of the present invention is to provide a method and an apparatus for a Peer-to-Peer (P2P) connection using a wireless Local Area Network (LAN) in a mobile communication terminal.

Another aspect of the present invention is to provide a method and an apparatus for additionally connecting another terminal in process of communication with P2P terminals in a mobile communication terminal.

Yet another aspect of the present invention is to provide a method and an apparatus for P2P-connecting another terminal by re-negotiating a group owner terminal when a mobile communication terminal in P2P connection detects a P2P connection attempt of the other terminal.

According to an aspect of the present invention, a method for P2P connection using a wireless LAN in a mobile communication terminal is provided. The method includes detecting a P2P connection attempt of a new terminal not connected to P2P communication, during P2P communication with at least one terminal, determining whether the mobile communication terminal operates as a slave terminal or a group owner in the P2P connection, and when the mobile communication terminal operates as the slave terminal, transmitting a signal indicating that the P2P connection attempt of the new terminal is detected, to a terminal operating as the group owner in the P2P connection.

According to another aspect of the present invention, an apparatus for P2P connection using a wireless LAN in a mobile communication terminal is provided. The apparatus includes a controller for detecting a P2P connection attempt of a new terminal not connected to P2P communication, during P2P communication with at least one terminal, and determining whether the mobile communication terminal operates as a slave terminal or a group owner in the P2P connection; and a communication module for, when the mobile communication terminal operates as the slave terminal, transmitting a signal indicating that the P2P connection attempt of the new terminal is detected, to a terminal operating as the group owner in the P2P connection under control of the controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments the present invention will

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and an apparatus of a mobile communication terminal which is in Peer-to-Peer (P2P) connection with at least one mobile communication terminal, for connecting with another mobile communication terminal using the P2P communication.

Hereinafter, exemplary embodiments of the present invention provide two terminals that are in the P2P connection and the terminal serving as a slave terminal detects a P2P connection attempt of another terminal. The exemplary embodiments of the present invention are equally applicable to a case where a plurality of terminals are connected using the P2P communication and one of the terminals serving as the slave terminal detects the P2P connection of another terminal.

Figure 1:
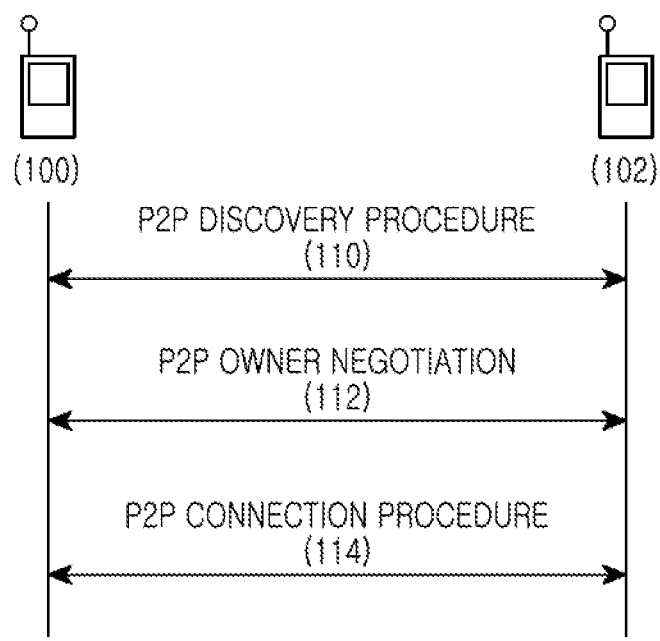
FIG. 1 illustrates a conventional Peer-to-Peer (P2P) connection with a structure including a group owner and a slave terminal between mobile communication terminals.
Figure 2:
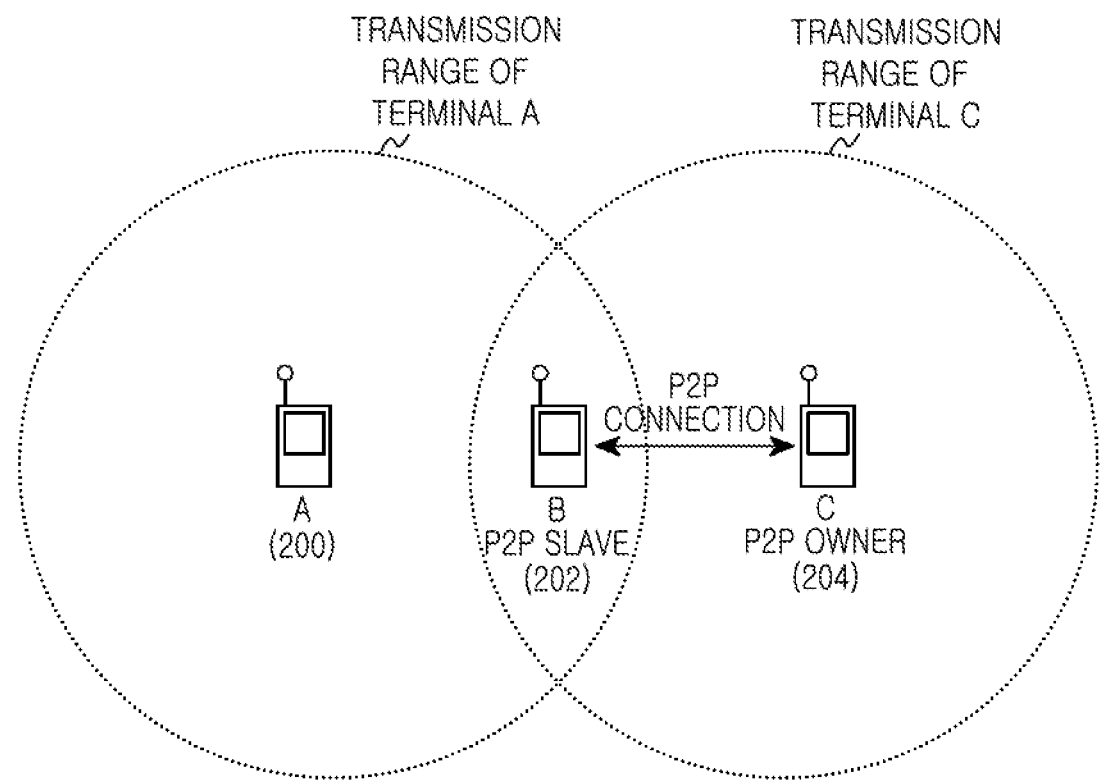
FIG. 2 illustrates a conventional P2P connectable range of a mobile communication terminal.
Figure 3:
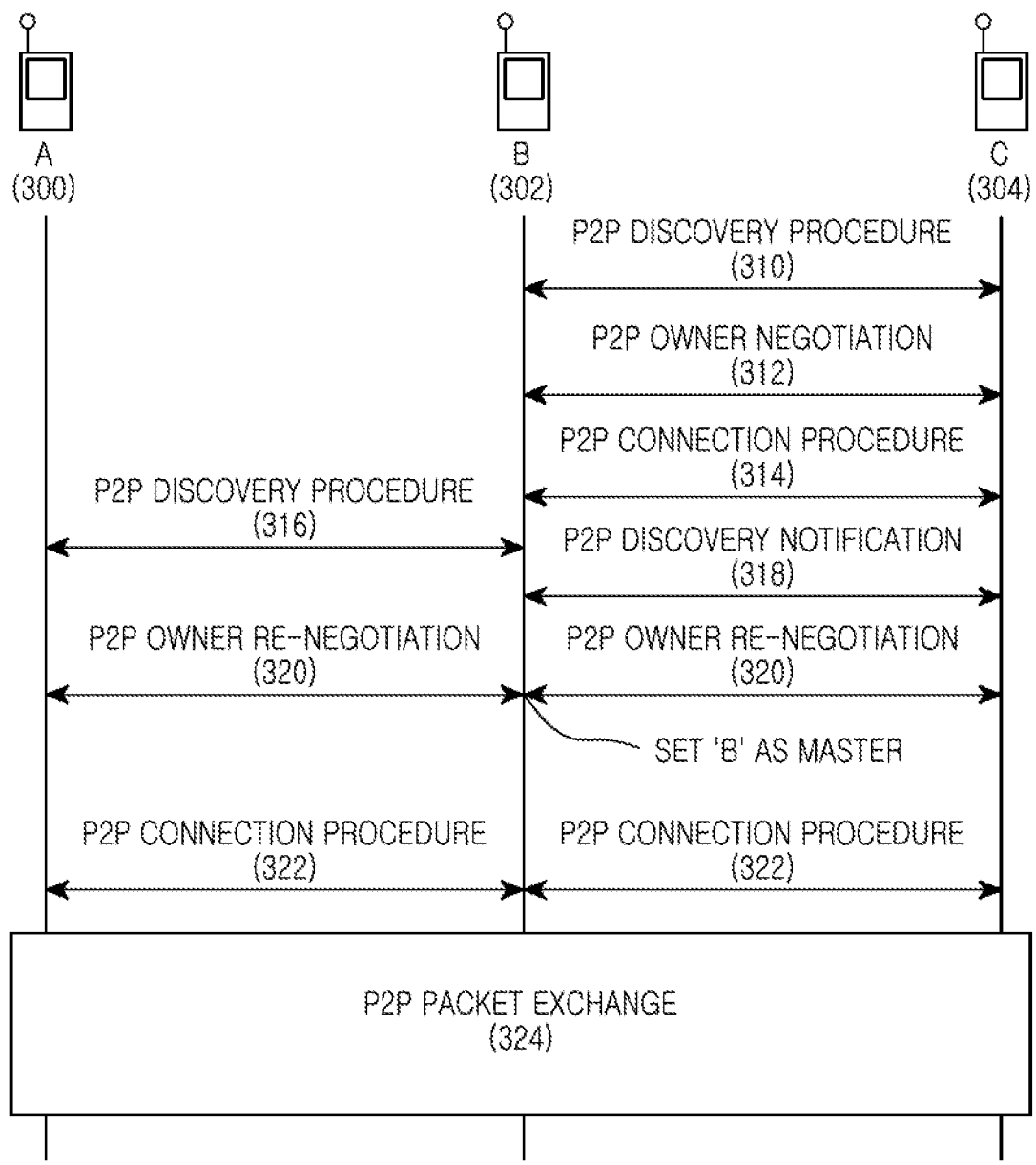
FIG. 3 illustrates a P2P connection through group owner re-negotiation between mobile communication terminals according to an exemplary embodiment of the present invention.

FIG. 3 illustrates a P2P connection through group owner re-negotiation between mobile communication terminals according to an exemplary embodiment of the present invention.

Referring to FIG. 3, a terminal B 302 wanting a P2P operation examines whether there is a P2P terminal in the vicinity through a P2P discovery procedure in step 310. Upon detecting a terminal C 304 as a neighbor P2P terminal, the terminal B 302 wanting the P2P operation establishes a P2P network through a P2P group owner negotiation procedure and a channel negotiation procedure with the detected P2P terminal C 304 in step 312. Herein, when the terminal B 302 is determined as a slave terminal and the terminal C 304 is determined as a group owner according to the group owner negotiation, the terminal B 302 set to the slave terminal attempts a connection to the terminal C 304 set to the group owner in step 314. Thus, the terminal B 302 and the terminal C 304 are connected with a P2P communication.

A terminal A 300 checks for a neighbor P2P terminal through the P2P discovery procedure in step 316, and the terminal B 302 serving as the slave terminal receives a discovery signal which is transmitted in the P2P discovery procedure of the terminal A 300.

To determine whether the terminal A 300 is connectable to the terminal C 304 serving as the group owner, the terminal B 302 serving as the slave terminal transmits a P2P discovery notification signal and receives a response signal of the P2P discovery notification from the terminal C 304 in step 318. If it is determined that the discovery signal of the terminal A 300 is not received, the terminal C 304 transmits a P2P discovery notification response signal indicating that the group owner may be delegated, to the terminal B 302 in step 318. In contrast, if it is determined that the discovery signal of the terminal A 300 is received, the terminal C 304 transmits a P2P discovery notification response signal indicative of a reception of the discovery signal of the terminal A 300, to the terminal B 302 in step 318, and then operates to connect to the terminal A 300 with the P2P communication. The P2P connection is carried out in the same manner as a conventional P2P connection.

The terminal B 302 receiving the P2P discovery notification response signal indicating that the group owner may be delegated transmits a signal for group owner re-negotiation to the terminal A 300 and the terminal C 304 in step 320. Hence, the terminal A 300, the terminal B 302, and the terminal C 304 perform the group owner re-negotiation procedure. Herein, in the group owner re-negotiation procedure, a terminal capable of connecting all existing P2P terminals and a new terminal to participate in the P2P connection is determined as the group owner terminal. If any one of the existing P2P terminals is not connected for the sake of the connection of the new terminal, the connection of the new terminal is rejected.

The terminal A 300, the terminal B 302, and the terminal C 304 build P2P networks through a P2P connection procedure in step 322, and exchange packets in step 324.

Figure 4:
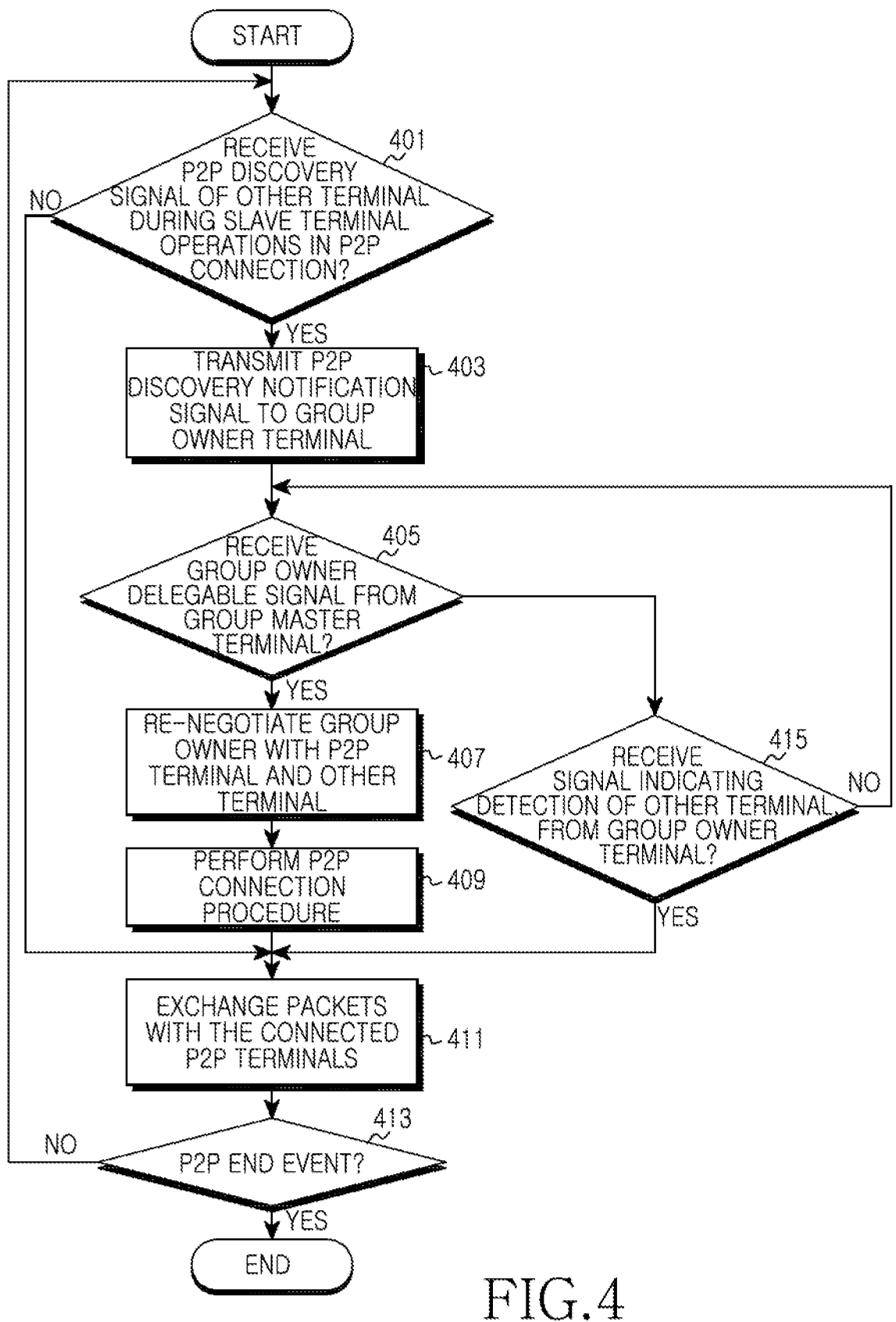
FIG. 4 illustrates operations of a mobile communication terminal serving as a slave terminal in a P2P connection according to an exemplary embodiment of the present invention.

FIG. 4 illustrates operations of a mobile communication terminal serving as a slave terminal in a P2P connection according to an exemplary embodiment of the present invention.

Referring to FIG. 4, in step 401, the mobile communication terminal operating as the slave terminal in the P2P connection examines whether a P2P discovery signal of another terminal is received in a process of the slave terminal operation. If the P2P discovery signal of the other terminal is not received, the mobile communication terminal exchanges packets with terminals connected to the P2P communication in step 411.

In contrast, upon receiving the P2P discovery signal of the other terminal, the mobile communication terminal transmits a P2P discovery notification signal indicative of a detection of the P2P connection attempt of the other terminal, to the group owner terminal in step 403. The P2P discovery notification signal may include an IDentifier (ID) of the other terminal.

In step 405, the mobile communication terminal determines whether a signal indicating that the group owner may be delegated is received from the group owner terminal in response to the P2P discovery notification signal. Upon receiving the signal indicating that the group owner may be delegated, the mobile communication terminal performs a group owner re-negotiation procedure with the group owner terminal and the other terminal by transmitting a signal for the group owner re-negotiation to the group owner terminal and the other terminal in step 407. As a result, the group owner is designated to a terminal capable of connecting all existing P2P terminals and a new terminal to participate in the P2P connection. If any one of the existing P2P terminals is not connected for the sake of the connection of the new terminal, the P2P connection of the new terminal may be rejected. For example, the group owner is determined as a terminal capable of receiving signals from all existing P2P terminals and the new terminal. The existing P2P terminals and the new terminal each examine whether it may receive signals from all of the existing P2P terminals and the new terminal, and inform of the result to the other terminal Consequently, the terminal receiving the signals from all of the terminals may be determined as the group owner terminal.

Figure 5:
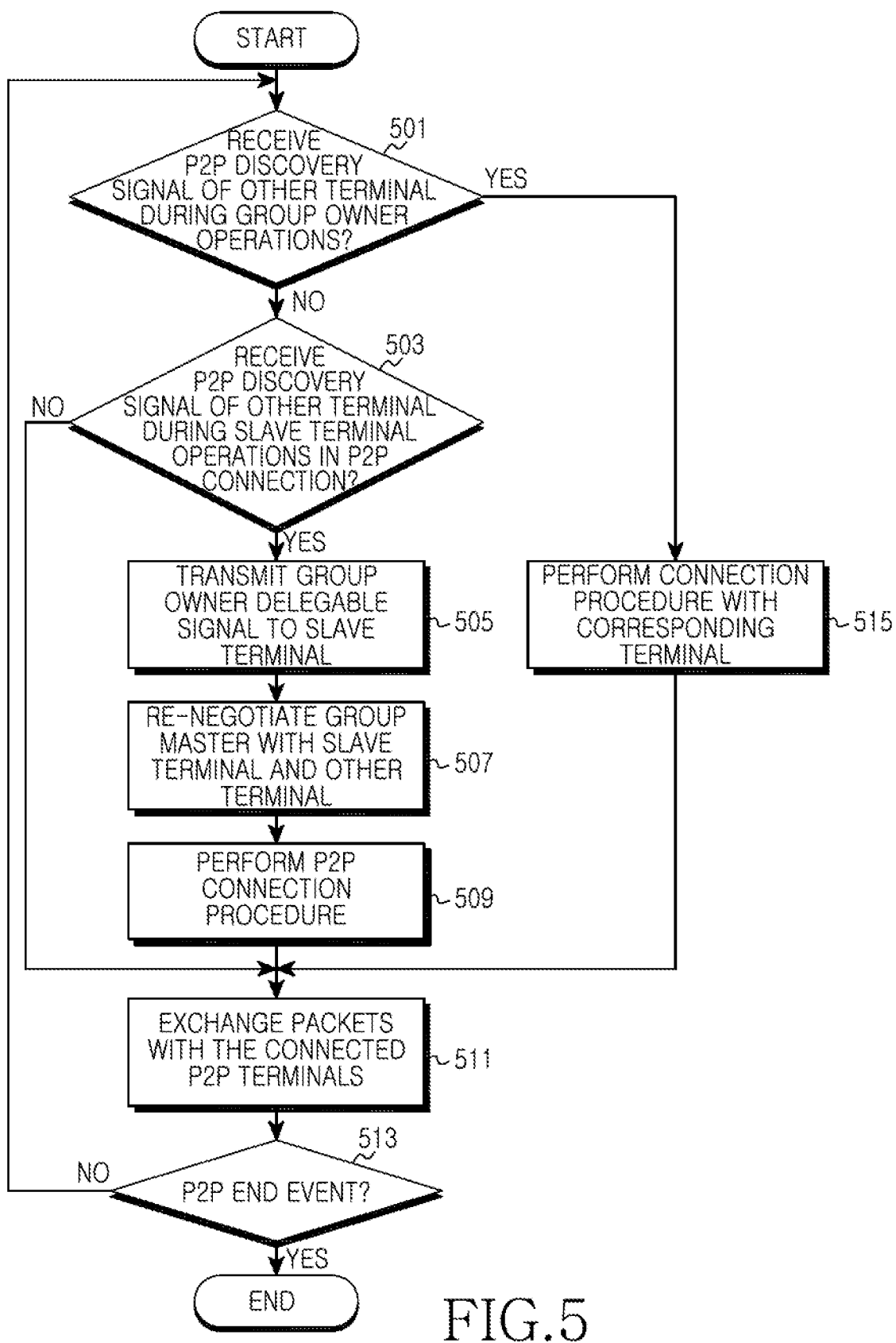
FIG. 5 illustrates operations of a mobile communication terminal serving as a group owner in a P2P connection according to an exemplary embodiment of the present invention.

The mobile communication terminal builds a P2P network through the P2P connection procedure with the existing P2P terminals and the new terminal in step 409, and exchanges packets with the P2P terminals in step 411. In step 413, the mobile communication terminal determines whether a P2P end event occurs. When the P2P connection end event occurs, the mobile communication terminal performs a P2P connection end procedure and finishes the process. In contrast, when the P2P connection end event does not occur, the mobile communication terminal returns to step 401. Herein, when the mobile communication terminal is determined as the group owner terminal in the group owner re-negotiation procedure, the mobile communication terminal operates as illustrated in FIG. 5, without returning to step 401. That is, when the mobile communication terminal still serves as the slave terminal in the P2P connection, the mobile communication terminal returns to step 401. When the mobile communication terminal is changed to the group owner terminal, it carries out operations of FIG. 5.

Meanwhile, if the mobile communication does not receive the signal indicating that the group owner may be delegated, the mobile communication terminal determines whether a signal indicative of the detection of the other terminal is received from the group owner terminal in response to the P2P discovery notification signal in step 415. Upon receiving the signal indicative of the detection of the other terminal from the group owner terminal, the mobile communication terminal exchanges packets with the P2P terminals in step 411. If the mobile communication terminal does not receive the signal indicative of the detection of the other terminal, the mobile communication terminal returns to step 405.

FIG. 5 illustrates operations of a mobile communication terminal serving as a group owner in a P2P connection according to an exemplary embodiment of the present invention.

Referring to FIG. 5, in step 501, the mobile communication terminal operating as the group owner in the P2P connection examines whether a P2P discovery signal of another terminal is received in a process of a group owner operation. Upon receiving a P2P discovery signal of the other terminal, the mobile communication terminal conducts the P2P connection procedure with the other terminal in step 515. Accordingly, the P2P connection procedure is carried out in the same manner as the conventional procedure. The mobile communication terminal exchanges packets with the P2P terminals in step 511.

If the mobile communication terminal does not receive the P2P discovery signal of the other terminal, the mobile communication terminal determines whether a P2P discovery notification signal indicating that a P2P connection attempt of the other terminal is detected, is received from the terminal serving as the slave terminal in the P2P connection in step 503. If it is determined that the P2P discovery notification signal from terminal serving as the slave terminal is not received, the mobile communication terminal exchanges packets with the P2P terminals in step 511.

In contrast, upon receiving the P2P discovery notification signal from the terminal operating as the slave terminal in step 503, the mobile communication terminal transmits a signal indicating the group owner may be delegated, in response to the P2P discovery notification signal in step 505. Although it is not illustrated, when receiving the P2P discovery signal of the other terminal and then receiving the P2P discovery notification message from the slave terminal, the mobile communication terminal may determine that the group owner terminal and the slave terminal receive the P2P discovery signal of the same terminal by comparing an ID of the P2P discovery notification message with the ID of the other terminal, and transmit the signal indicating that the other terminal is detected, in response to the P2P discovery notification signal.

The mobile communication terminal transmitting the signal indicating that the group owner may be delegated in step 505, conducts the group owner re-negotiation procedure with the slave terminal and the other terminal in step 507. Accordingly, the group owner is designated to the terminal capable of connecting all existing P2P terminals and a new terminal to participate in the P2P connection. If any one of the existing P2P terminals is not connected for the sake of the connection of the new terminal, the P2P connection of the new terminal may be rejected. For example, the group owner is determined as a terminal capable of receiving signals from all of the existing P2P terminals and the new terminal.

The mobile communication terminal builds the P2P network through the P2P connection procedure with the existing P2P terminals and the new terminal in step 509, exchange packets with the P2P terminals in step 511, and determines whether a P2P end event occurs in step 513. If it is determined that the P2P connection end event occurs, the mobile communication terminal performs the P2P connection end procedure and finishes the process. In contrast, if it is determined that the P2P connection end event does not occur, the mobile communication terminal returns to step 501. Herein, when the mobile communication terminal is determined as the slave terminal in the group owner re-negotiation procedure, the mobile communication terminal operates as illustrated in FIG. 4, without returning to step 501. That is, when the mobile communication terminal still serves as the group owner terminal in the P2P connection, the mobile communication terminal returns to step 501. When the mobile communication terminal is changed to the slave terminal, the mobile communication terminal carries out the operations of FIG. 4.

Figure 6:
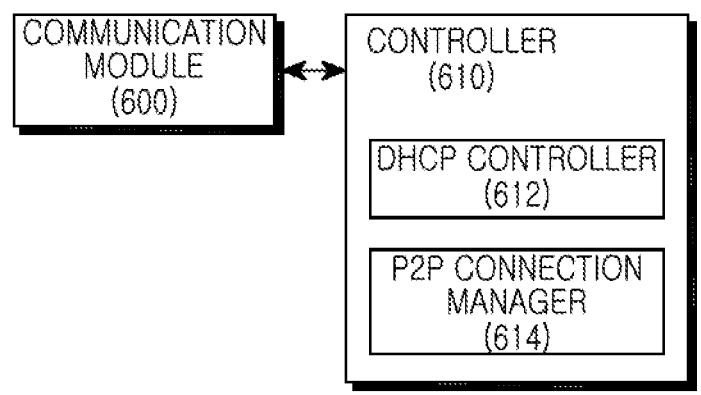
FIG. 6 is a block diagram of a mobile communication terminal according to an exemplary embodiment of the present invention.

FIG. 6 is a block diagram of a mobile communication terminal according to an exemplary embodiment of the present invention.

Referring to FIG. 6, the mobile communication terminal of FIG. 6 includes a communication module 600 and a controller 610. The controller 610 includes a Dynamic Host Configuration Protocol (DHCP) controller 612 and a P2P connection manager 614. Herein, the mobile communication terminal is a terminal supporting not only a voice communication function but also Wireless Fidelity (WiFi) using a wireless Local Area Network (LAN).

The communication module 600 includes a block for communicating with a cellular network and a block for communicating with the wireless LAN, and processes signals transmitted and received to and from a base station or an Access Point (AP) over an antenna (not illustrated). More particularly, the communication module 600 processes to transmit and receive the signals for the P2P connection with another neighbor terminal, and exchanges the packets with the P2P-connected terminals under the control of the controller 610.

The controller 610 controls and processes operations of the mobile communication terminal. By including the DHCP controller 612 for controlling the DHCP to support the P2P and the P2P connection manager 614 for managing the P2P connection with the neighbor terminal, the controller 610 performs the P2P connection with the neighbor terminal, and controls and processes to connect with the other terminal using the P2P communication by detecting the P2P connection attempt of the other terminal during the P2P connection. That is, when receiving the P2P discovery notification signal notifying that the mobile communication terminal in the P2P connection with the other terminal receives the P2P discovery signal attempting the P2P connection from a new terminal, or receives the P2P discovery signal of the new terminal from the other terminal, the controller 610 functions for the P2P connection of the new terminal Herein, depending on whether the mobile communication terminal served as a slave terminal or a group owner in an existing P2P connection, the controller 610 performs different operations to connect the new terminal.

In a case where the mobile communication terminal functions in a slave terminal mode in the existing P2P connection, if the P2P discovery signal of the new terminal which is not connected in the existing P2P communication is received, the controller 610 controls to transmit the P2P discovery notification signal to the terminal serving as the group owner in the existing P2P connection. If the group owner delegable signal from the group owner terminal is received, the controller 610 determines the group owner by performing the group owner re-negotiation procedure with the existing P2P-connected terminals and the new terminal, and controls and processes to exchange packets through the P2P connection procedure.

In a case where the mobile communication terminal functions in a group owner mode in the existing P2P connection, when receiving the P2P discovery signal of the new terminal which is not connected in the existing P2P communication, the controller 610 conducts the same process as a conventional process to connect the new terminal to the P2P communication. When receiving the P2P discovery notification signal from the terminal operating the slave terminal of the existing P2P connection, the controller 610 controls and processes to transmit the signal indicating the group owner may be delegated to the terminal operating as the slave terminal. The controller 610 determines the group owner by performing the group owner re-negotiation procedure with the existing P2P-connected terminals and the new terminal, and controls and processes to exchange packets through the P2P connection procedure.

Herein, the group owner is designated to the terminal capable of connecting all of the existing P2P terminals and the new terminal to participate in the P2P connection. If any one of the existing P2P terminals is not connected for the sake of the connection of the new terminal, the connection of the new terminal is rejected. For example, the group owner is determined as the terminal capable of receiving signals from all of the existing P2P terminals and the new terminal.

When the mobile communication terminal in the P2P connection detects the P2P connection attempt of another terminal, the mobile communication terminal connects the other terminal to the P2P communication by re-negotiating the group owner terminal Therefore, a terminal traveling in the area connectable to the terminal serving as the slave terminal in the P2P connection and out of the connection area to the terminal serving as the group owner can participate in the P2P connection.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method comprising:
   during a first connection between a first device and a second device, receiving, at the first device, a peer-to-peer (P2P) discovery signal transmitted by a third device for a second connection between the first device and the third device;
   while the first device does not operate as a host device after the first device receives the P2P discovery signal:
      transmitting, by the first device to the second device, a signal indicating that the P2P discovery signal has been received, while the second device operates as the host device, and
      after the first device transmits the signal, determining the first device as the host device; based on a determination that the first device receives signals of the second device and signals of the third device, while maintaining the first connection with the second device; and
   in response to determining the first device as the host device, establishing the second connection between the first device and the third device.

2. The method of claim 1, wherein at least one of the first connection or the second connection comprises a P2P connection using a wireless local area network (LAN).

3. The method of claim 1, wherein the host device in the first connection comprises a group owner in the first connection.

4. The method of claim 1, further comprising the first device exchanging packets with one of the second device and the third device through at least one of the first connection or the second connection.

5. The method of claim 1, further comprising, while the first device operates as the host device, establishing the second connection.

6. The method of claim 1, further comprising, while the first device operates as the host device:
determining whether the signal indicating that the P2P discovery signal has been received at the first device is received, and
in response to receiving the signal indicating that the P2P discovery signal has been received, transmitting, to the second device, a signal indicating that the third device is detected, based at least in part on a determination that an identifier (ID) included in the signal indicating that the P2P discovery signal has been received is identical to an ID of the third device.

7. The method of claim 6, further comprising, while the first device operates as the host device, the ID of the third device included in the signal indicating that the third device is detected, and the ID of the third device detected by the first device are not identical, transmitting, to the second device operating as a slave device, a signal to initiate a re-determining of the host device.

8. An apparatus comprising:
a transceiver configured to, while a first device operates as a host device, transmit, to the first device during a first connection between the apparatus and the first device, a signal indicating that a peer-to-peer (P2P) discovery signal transmitted by a second device for a second connection between the apparatus and the second device has been received; and
at least one processor,
wherein the at least one processor is configured to, while the apparatus does not operate as the host device:
control the transceiver to receive the P2P discovery signal transmitted by the second device during communication with the first device via the first connection,
in response to receiving the P2P discovery signal, control the transceiver to transmit, to the first device, the signal, and
after transmitting the signal, determine the apparatus as the host device based on a determination that the apparatus receives signals of the first device and signals of the second device, while maintaining the first connection with the first device, and
wherein the at least one processor is further configured to, in response to determining the first device as the host device, control the transceiver to establish the second connection between the apparatus and the second device.

9. The apparatus of claim 8, wherein the host device is determined to receive signals of at least one of the first device or the second device.

10. The apparatus of claim 8, wherein the host device comprises the first device prior to a host device re-negotiating procedure.

11. The apparatus of claim 8, wherein the transceiver is further configured to exchange packets with at least one of the first device or the second device connected to at least one of the first connection or the second connection.

12. The apparatus of claim 8, wherein the transceiver is further configured to receive a signal, which indicates that a P2P discovery signal of a third device has been received, from the first device operating as the host device in the first connection.

13. The apparatus of claim 8, wherein the transceiver is further configured to, while the apparatus operates as the host device, perform a P2P connection procedure with the second device under control of the at least one processor.

14. The apparatus of claim 13, wherein the at least one processor is further configured to, while the apparatus operates as the host device:
in response to the apparatus determining that the signal, which indicates that the P2P discovery signal has been received, is received from the first device, the first device operating as a slave device in the first connection, and in response to receiving the signal indicating that the P2P discovery signal has been received, determine whether an identifier (ID) of the second device included in the signal received from the first device is identical to an ID of the second device, and
in response to determining that the ID of the second device included in the signal received from the first device and the ID of the second device detected by the apparatus are identical, control the transceiver to transmit a signal to the first device operating as the slave device, the signal indicating that the second device is detected.

15. The apparatus of claim 14, wherein the transceiver is further configured to, when the ID of the second device included in the signal received from the first device and the ID of the second device detected by the apparatus are not identical, transmit a group owner delegable signal to the first device operating as the slave device.

16. The apparatus of claim 8, wherein the at least one processor is further configured to control the transceiver to receive the P2P discovery signal of the second device.

17. The apparatus of claim 8, wherein the at least one processor is further configured to, while the apparatus operates as the host device, establish the second connection with the second device.

18. A non-transitory machine-readable storage device storing instructions that, when executed by one or more processors, cause the one or more processors to perform operations comprising:
during a first connection between a first device and a second device, receiving, at the first device, a peer-to-peer (P2P) discovery signal transmitted by a third device for a second connection between the first device and the third device;
while the first device does not operate as a host device in the first connection after the first device receives the P2P discovery signal:
transmitting, by the first device to the second device, a signal indicating that the P2P discovery signal has been received, while the second device operates as the host device, and
after the first device transmits the signal, determining the first device as the host device; based on a determination that the first device receives signals of the second device and signals of the third device, while maintaining the first connection with the second device; and
in response to determining the first device as the host device, establishing the second connection between the first device and the third device.

* * * * *